United States Patent
Koved et al.

(10) Patent No.: US 10,097,544 B2
(45) Date of Patent: Oct. 9, 2018

(54) PROTECTION AND VERIFICATION OF USER AUTHENTICATION CREDENTIALS AGAINST SERVER COMPROMISE

(71) Applicant: International Business Machines Corporation, Armonk, NY (US)

(72) Inventors: Lawrence Koved, Pleasntville, NY (US); Ian M. Molloy, Chappaqua, NY (US); Gelareh Taban, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 15/169,965

(22) Filed: Jun. 1, 2016

(65) Prior Publication Data

US 2017/0353450 A1    Dec. 7, 2017

(51) Int. Cl.
  H04L 29/06      (2006.01)
  G06F 13/42      (2006.01)
  H04L 9/32       (2006.01)
  H04L 9/00       (2006.01)
  H04L 9/30       (2006.01)
  H04L 1/00       (2006.01)

(52) U.S. Cl.
  CPC ...... H04L 63/0861 (2013.01); G06F 13/4282 (2013.01); H04L 63/045 (2013.01); H04L 63/061 (2013.01); H04L 63/083 (2013.01); H04L 2463/062 (2013.01)

(58) Field of Classification Search
  None
  See application file for complete search history.

(56) References Cited

U.S. PATENT DOCUMENTS

| 7,047,408 | B1  | 5/2006  | Boyko et al. |
| 7,646,874 | B2  | 1/2010  | Iwamoto et al. |
| 8,762,712 | B1* | 6/2014  | Kwan ............... H04L 9/0825 380/30 |
| 9,020,207 | B2* | 4/2015  | Paul ............... G06F 21/32 382/115 |
| 9,087,187 | B1  | 7/2015  | Doane |
| 9,185,111 | B2  | 11/2015 | Corella et al. |
| 9,231,971 | B2  | 1/2016  | Patel et al. |
| 9,258,117 | B1  | 2/2016  | Roth et al. |

(Continued)

OTHER PUBLICATIONS

Camenisch et al., "Practical Yet Universally Composable Two-Server Password-Authenticated Secret Sharing," Proceedings of the 2012 ACM Conference on Computer and Communications Security (CCCS '12), Oct. 2012, pp. 525-536.

(Continued)

*Primary Examiner* — Eric Chen
(74) *Attorney, Agent, or Firm* — Yee & Associates, P.C.; Jeffrey S. LaBaw

(57) ABSTRACT

Authenticating a user is provided. A decryption key corresponding to an authentication account of the user of a client device and authentication credential data obtained from the user of the client device is received during authentication. Encrypted authentication credential data corresponding to the user is decrypted using the received decryption key corresponding to the authentication account of the user. The decrypted authentication credential data is compared with the received authentication credential data to authenticate the user of the client device.

17 Claims, 10 Drawing Sheets

(56) References Cited

U.S. PATENT DOCUMENTS

| | | | |
|---|---|---|---|
| 9,619,804 B1* | 4/2017 | Thatte | G06Q 20/40145 |
| 2002/0194473 A1* | 12/2002 | Pope | G06F 21/31 |
| | | | 713/168 |
| 2007/0038863 A1* | 2/2007 | Nguyen | G06F 21/6254 |
| | | | 713/176 |
| 2007/0297606 A1* | 12/2007 | Tkacik | G06F 21/31 |
| | | | 380/239 |
| 2014/0223528 A1 | 8/2014 | Slutsker et al. | |
| 2015/0039908 A1 | 2/2015 | Lee et al. | |
| 2015/0113283 A1 | 4/2015 | Corella et al. | |
| 2015/0288694 A1 | 10/2015 | Liebl, III et al. | |

OTHER PUBLICATIONS

Chang et al., "Hiding Secret Points Amidst Chaff," Advances in Cryptology—EUROCRYPT 2006, Lecture Notes in Computer Science vol. 4004, May 2006, pp. 59-72.

Dodis et al., "Fuzzy Extractors: How to Generate Strong Keys from Biometrics and Other Noisy Data," Advances in Cryptology—EUROCRYPT 2004, Lecture Notes in Computer Science vol. 3027, May 2004, pp. 523-540.

Juels et al., "A Fuzzy Commitment Scheme," Proceedings of the 6th ACM Conference on Computer and Communications Security (CCS '99), Nov. 1999, pp. 28-36.

Juels et al., "A Fuzzy Vault Scheme," Designs, Codes and Cryptography, vol. 38, Issue 2, Feb. 2006, pp. 237-257.

Juels et al., "Honeywords: Making Password-Cracking Detectable," Proceedings of the 2013 ACM SIGSAC Conference on Computer & Communications Security (CCS '13), Nov. 2013, pp. 145-159.

Li et al., "Secure Sketch for Biometric Templates," Advances in Cryptology—ASIACRYPT 2006, Lecture Notes in Computer Science vol. 4284, Dec. 2006, pp. 99-113.

MacKenzie et al., "Threshold Password-Authenticated Key Exchange," Advances in Cryptology—CRYPTO 2002, Lecture Notes in Computer Science vol. 2442, Aug. 2002, pp. 385-400.

Mell et al., "The NIST Definition of Cloud Computing," National Institute of Standards and Technology Special Publication 800-145, Sep. 2011, 7 pages.

Shirvanian et al., "Two-Factor Authentication Resilient to Server Compromise Using Mix-Bandwidth Devices," The Network and Distributed System Security Symposium (NDSS '14), Feb. 2014, 16 pages.

Steele, "Images that fool computer vision raise security concerns," Cornell Chronicle, Mar. 20, 2015, 2 pages. http://news.cornell.edu/stories/2015/03/images-fool-computer-vision-raise-security-concerns.

Zhu et al., "An Efficient Client-to-Client Password-Authenticated Key Exchange Resilient to Server Compromise," 13th Pacific Rim International Symposium on Dependable Computing (PRDC 2007), Dec. 2007, pp. 405-408.

* cited by examiner

PROTECTION AND VERIFICATION OF USER AUTHENTICATION CREDENTIALS AGAINST SERVER COMPROMISE

BACKGROUND

1. Field

The disclosure relates generally to protection of user authentication credentials stored on a server and more specifically to verification of a user of a client device by the server during authentication using a decryption key received from the client device to decrypt a credential blob stored in a user authentication account on the server.

2. Description of the Related Art

An open problem in network security is the vulnerability of credential verification information stored on a server to wholesale theft in the event of server compromise. Credentials are a way to identify and authenticate a client device user. Examples of credentials may include user names, passwords, and biometric data corresponding to the user. These credentials are stored on the server for comparison with received credentials for verification and authentication of client device users.

However, there are many different types of compromises available to exploit a server to misappropriate these stored credentials. Under many circumstances, an attacker may exploit a server using common techniques, such as using a brute force attack to guess a weak password or attempting to use known vulnerabilities in software of the server in hopes the server is not on a regular patch schedule. In addition, attackers are always evolving and changing their tactics.

When an attacker compromises a server, the attacker has access to the credential verification information, which is used to authenticate the users, stored on the server. Once the attacker has access to this credential verification information, the attacker can user various means to reverse engineer authentication credentials from the misappropriated credential verification information.

SUMMARY

According to one illustrative embodiment, a computer-implemented method for authenticating a user is provided. A computer receives a decryption key corresponding to an authentication account of the user of a client device and authentication credential data obtained from the user of the client device during authentication. The computer decrypts encrypted authentication credential data corresponding to the user using the received decryption key corresponding to the authentication account of the user. The computer compares the decrypted authentication credential data with the received authentication credential data to authenticate the user of the client device. According to other illustrative embodiments, a computer system and computer program product for authenticating a user are provided.

DETAILED DESCRIPTION

Figure 1:
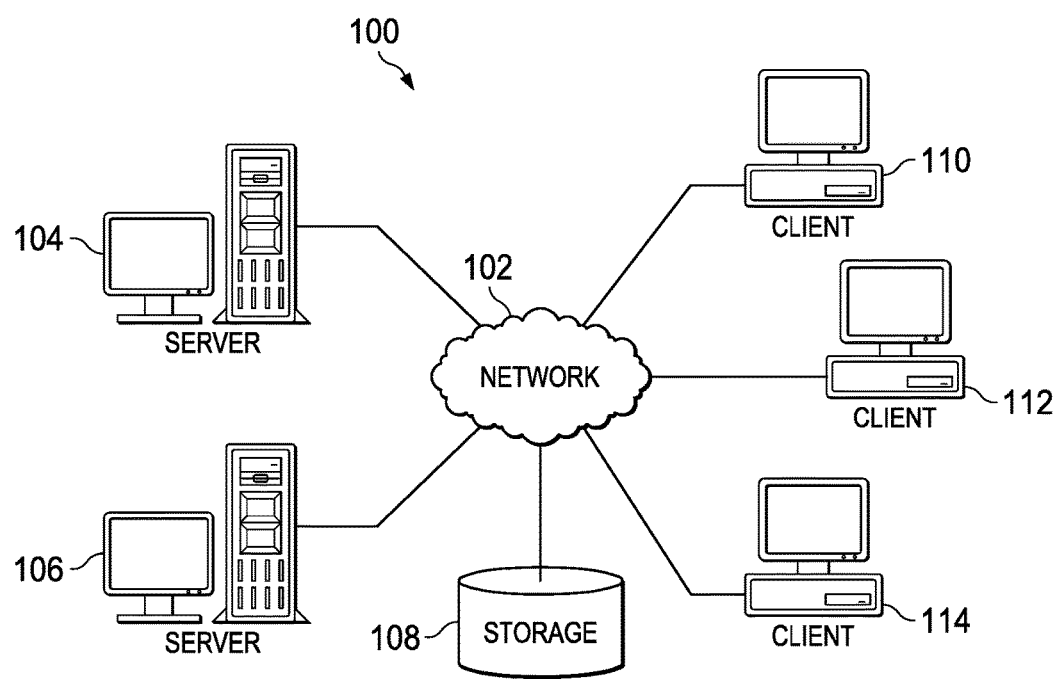
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102 and may each represent a set of one or more server computers. In addition, server 104 may be an authentication server that protects server 106 from unauthorized user access by providing a user authentication service. The user authentication service verifies whether a requesting client device user is authentic based on credentials entered by the user during an authentication process to server 106. Server 106 may provide, for example, a set of one or more services that process sensitive data. For example, server 106 may provide a service that processes sensitive financial information corresponding to account owners. However, it should be noted that server 106 may provide any type of service that provides or processes any type sensitive data corresponding to individuals, businesses, enterprises, governmental agencies, organizations, institutions, and the like.

Client 110, client 112, and client 114 also connect to network 102. Clients 110, 112, and 114 are clients of server 104 and server 106. Server 104 and server 106 may provide information, such as boot files, operating system images, and software applications to clients 110, 112, and 114.

In this example, clients 110, 112, and 114 are shown as desktop computers that may include wire or wireless communication links to network 102. However, it should be noted that clients 110, 112, and 114 are intended as examples only. In other words, clients 110, 112, and 114 also may include other devices, such as, for example, network computers, laptop computers, handheld computers, smart phones, smart watches, personal digital assistants, gaming devices, kiosks, set-top boxes, or any combination thereof. Users of clients 110, 112, and 114 may use clients 110, 112, and 114 to access the set of services provided by server 106.

Storage 108 is a network storage device capable of storing any type of data in a structured format or an unstructured format. In addition, storage 108 may represent a set of one or more network storage devices. Storage 108 also may be protected by server 104. Storage 108 may store, for example, names and identification data corresponding to a plurality of different client device users and user authentication account information that includes encrypted authentication credential data corresponding to each of the different client device users. The encrypted authentication credential data may include, for example, user names, passwords, biometric data, credit card information, and the like. The biometric data may be, for example, a biometric template. A biometric template is a digital representation of a client device user's distinct characteristics that have been extracted from a biometric sample. The biometric sample of the user may be obtained by, for example, a fingerprint scan, a palm scan, a retinal scan, a facial scan, a voice scan, a magnetic resonance imaging scan, a computer-assisted tomography scan, an electroencephalogram, an electrocardiogram, and the like. The biometric template is used during a process to authenticate the user of the client device.

In addition, it should be noted that network data processing system 100 may include any number of additional server devices, client devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example and not as an architectural limitation for the different illustrative embodiments.

Figure 2:
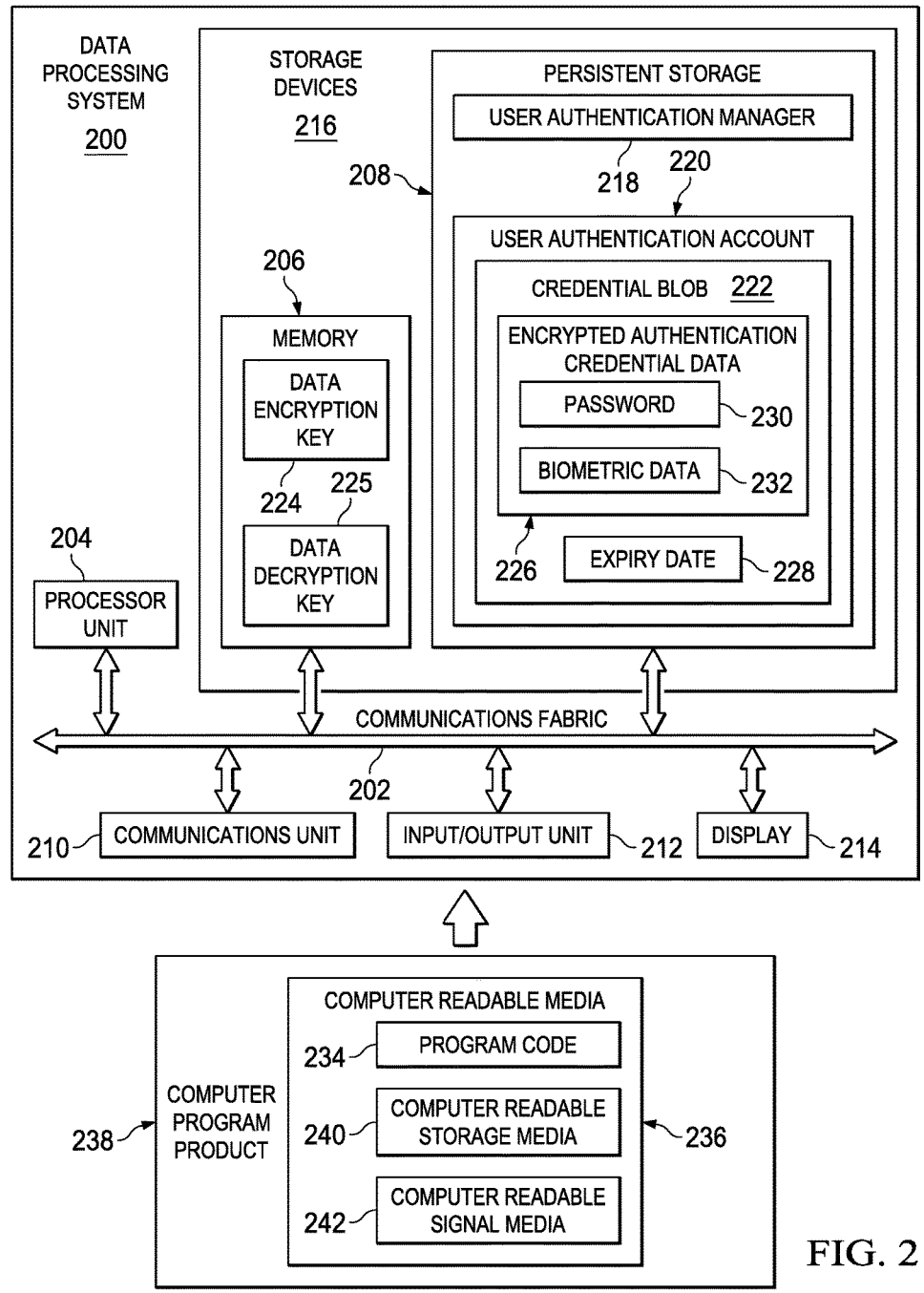
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores user authentication manager 218. User authentication manager 218 authenticates users of client devices during authentication using decryption keys received from respective client devices to decrypt credential blobs stored in corresponding user authentication accounts on data processing system 200. It should be noted that even though user authentication manager 218 is illustrated as residing in persistent storage 208, in an alternative illustrative embodiment user authentication manager 218 may be a separate component of data processing system 200. For example, user authentication manager 218 may be a hardware component coupled to communication fabric 202 or a combination of hardware and software components.

Also in this example, persistent storage 208 stores user authentication account 220, credential blob 222, encrypted authentication credential data 226, and expiry date 228. However, it should be noted that alternative illustrative embodiments may include more or less data than illustrated. Memory 206 temporarily stores data encryption key 224 and data decryption key 225.

User authentication account 220 is an account that corresponds to a particular user of a client device. In this example, user authentication account 220 includes credential blob 222. Credential blob 222 represents a data envelope containing information corresponding to the particular user. In this example, credential blob 222 contains encrypted authentication credential data 226. Data encryption key 224 represents a data encryption key that was previously sent to data processing system 200 from the client device of the user. Encrypted authentication credential data 226 represents authentication credential data corresponding to the user that was encrypted by data processing system 200 using data encryption key 224 previously received from the client device of the user. Data decryption key 225 represents a data decryption key that was previously sent to data processing system 200 from the client device of the user. If illustrative embodiments utilize symmetric encryption, then it should be noted that data encryption key 224 and data decryption key 225 may be the same. Alternatively, if illustrative embodiments utilize asymmetric encryption, then it should be noted that data encryption key 224 may be a public key and data decryption key 225 may be a private key. Those skilled in the art will recognize that other possible implementations of data encryption key 224 and data decryption key 225 exist.

In this example, encrypted authentication credential data 226 comprises password 230 and biometric data 232. Password 230 represents a password created by the particular user. Biometric data 232 represents a biometric template corresponding to the particular user that was generated from a biometric sample previously obtained from the particular user. However, it should be noted that encrypted authentication credential data 226 may comprise only password 230 or only biometric data 232. In addition, encrypted authentication credential data 226 may comprise other information, such as, for example, credit card information. User authentication manager 218 compares authentication credential data received from the client device of the particular user during an authentication attempt with the authentication credential data stored persistent storage 208 to determine whether the particular user is authentic or not.

Credential blob 222 also includes expiry date 228. Expiry date 228 represents a time when the information contained in credential blob 222 expires or is no longer valid. Further, it should be noted that user authentication account 220 may include other information, such as, for example, name and identification data, which uniquely identifies the particular user. Furthermore, it should be noted that user authentication account 220 may represent a plurality of different user authentication accounts corresponding to a plurality of different users of client devices.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 234 is located in a functional form on computer readable media 236 that is selectively removable and may be loaded onto or transferred to data processing system 200 for running by processor unit 204. Program code 234 and computer readable media 236 form computer program product 238. In one example, computer readable media 236 may be computer readable storage media 240 or computer readable signal media 242. Computer readable storage media 240 may include, for example, an optical or magnetic disc that is inserted or placed into a drive or other device that is part of persistent storage 208 for transfer onto a storage device, such as a hard drive, that is part of persistent storage 208. Computer readable storage media 240 also may take the form of a persistent storage, such as a hard drive, a thumb drive, or a flash memory that is connected to data processing system 200. In some instances, computer readable storage media 240 may not be removable from data processing system 200.

Alternatively, program code 234 may be transferred to data processing system 200 using computer readable signal media 242. Computer readable signal media 242 may be, for example, a propagated data signal containing program code 234. For example, computer readable signal media 242 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 234 may be downloaded over a network to persistent storage 208 from another device or data processing system through computer readable signal media 242 for use within data processing system 200. For instance, program code stored in a computer readable storage media in a data processing system may be downloaded over a network from the data processing system to data processing system 200. The data processing system providing program code 234 may be a server computer, a client computer, or some other device capable of storing and transmitting program code 234.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 240 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
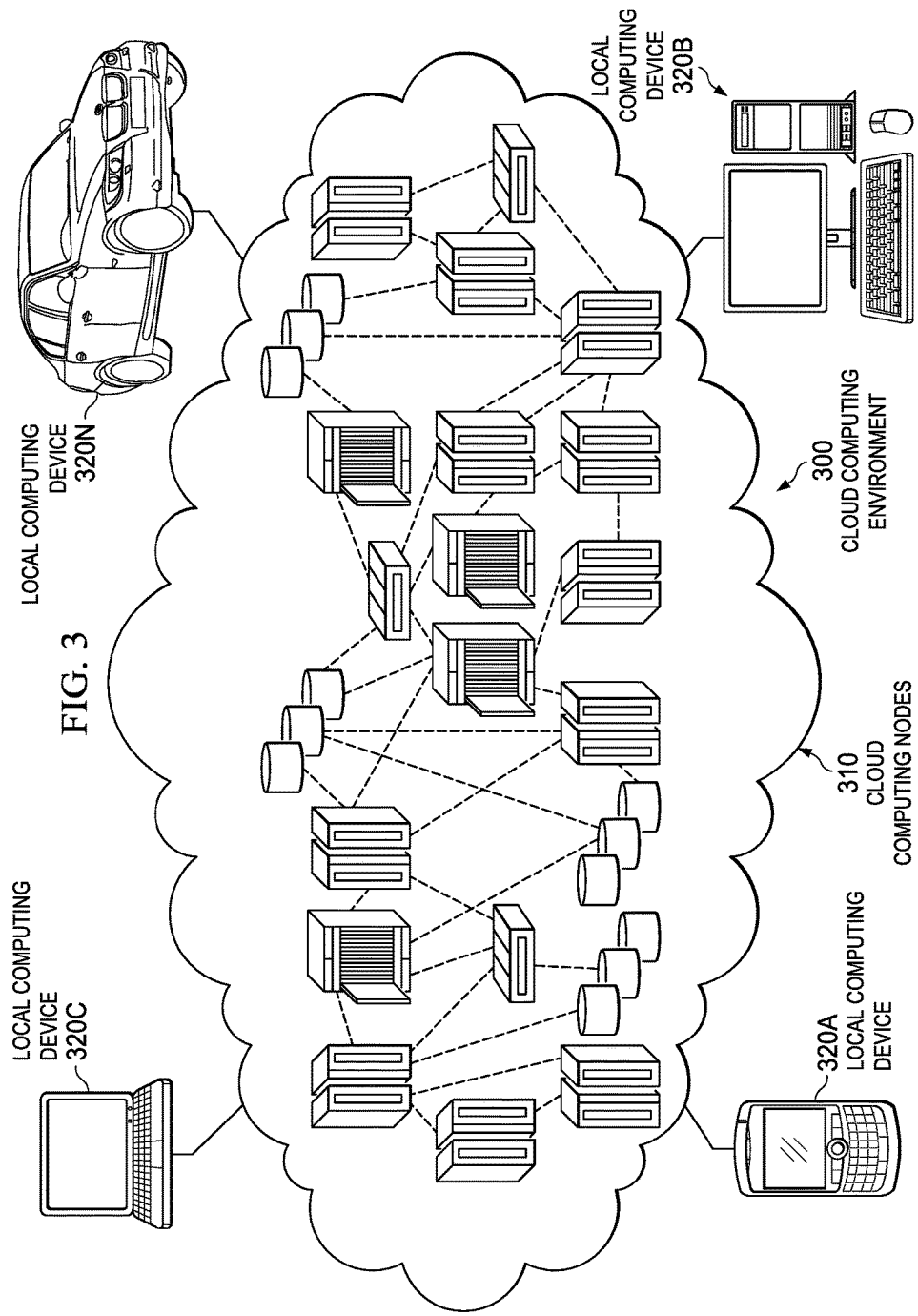
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or a smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of computing devices 320A-320N are intended to be illustrative only and that cloud computing nodes 310 and cloud computing environment 300 can communicate with any type of computerized device over any type of network and/or network addressable connection using a web browser, for example.

Figure 4:
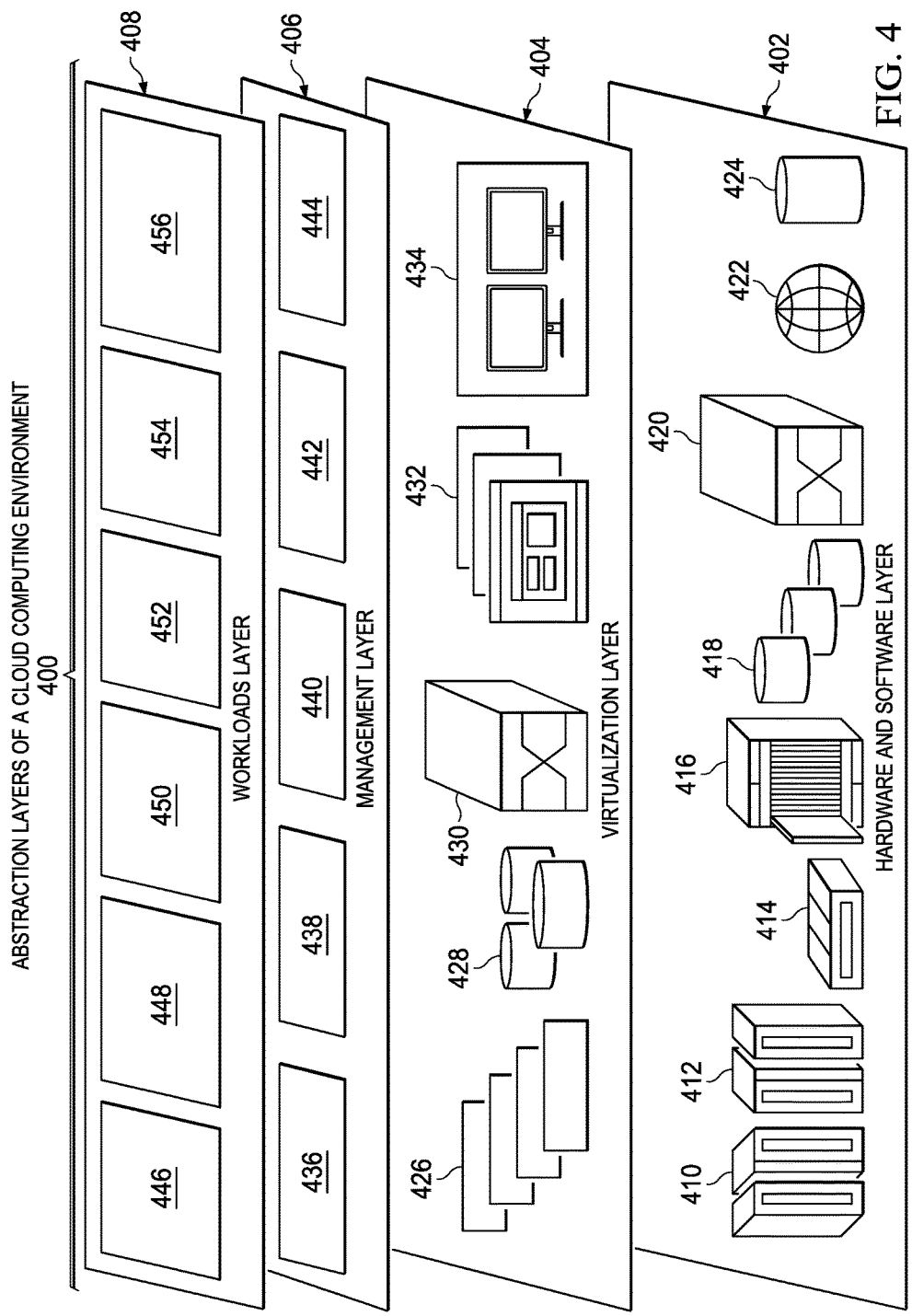
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 includes hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and user authentication processing 456.

In the course of developing illustrative embodiments, it was discovered that current approaches to protecting credential verification information rely on computational complexity imposed on an attacker, such as salted one-way hashes, hash stretching, and slow hashes of credentials. In these current approaches, the server still maintains some of the credential verification information and so the credential verification information is open to attack. For example, advances in graphical processor unit (GPU) power, distributed hash cracking algorithms, and availability to cloud computing may allow an attacker to recover user authentication credential information from the server. This allows the attacker to further launch authentication attacks or credential re-use attacks.

Illustrative embodiments provide a framework that may eliminate wholesale misappropriation of authentication credential information stored on a server, assuming a powerful attacker. However, illustrative embodiments may not stop a computationally unbounded attacker, but may limit utility of the misappropriation. In addition, the authentication scheme of illustrative embodiments is efficient for large-sized credentials, such as biometric templates. The trust implications of this framework are massive given the privacy concerns around the network storage of biometric data in the current threat environment.

The framework of illustrative embodiments allows management of user authentication credentials, which includes revocation of a user or client device, addition of a user or client device, loss of cryptographic keys, and the like. A high level overview of an illustrative embodiment is as follows: 1) On each authentication attempt, a user presents a cryptographic key, such as, for example, a data decryption key that is appropriate to the authentication scheme, along with authentication credential data, such as a password and/or a biometric sample, to a server. 2) The server uses the data decryption key to recover information contained in a credential blob of an authentication account corresponding to the user and verifies whether the presented authentication credential data is authentic or non-authentic. 3) The server then deletes all unencrypted authentication credential data and the data decryption key.

Upon account registration, a user registers for an authentication account with the server to become a registered user. A client device corresponding to the user generates and stores a set of cryptographic keys, such as a data encryption key and a data decryption key. The client device of the user sends the set of cryptographic keys and authentication credential data to the server. The server uses the data encryption key to encrypt the authentication credential data. It should be noted that the data encryption key corresponding to the user authentication account can be encrypted under different key encrypting keys, allowing support for multiple user client devices and easy revocation. In addition, the different key encrypting keys may be used for different authentication lifetimes and may include entitlements, such as, for example, resource access information corresponding to the user. The client device is in possession of the encryption and decryption keys and the server stores the encrypted credential blob. The client device sends to the server the data decryption key on each authentication request. The server places the encrypted authentication credential data in the credential blob. The authentication server stores the credential blob, expiry date corresponding to the credential blob, and other metadata in the user authentication account. The server then deletes all state data, which includes the encryption key and any unencrypted or plaintext authentication credential data.

During user authentication, the user sends the data decryption key, as well as authentication credential data corresponding to the user, to the server at each authentication attempt. The server uses the data decryption key to decrypt the encrypted authentication credential data in the credential blob. Afterward, the server compares the decrypted authentication credential data with the received authentication credential data. The server either verifies or denies the user as authentic based on the authentication credential data comparison process. Afterward, the authentication server deletes the decrypted authentication credential data, the received authentication credential data, and the data decryption key.

Thus, illustrative embodiments improve over the prior art by preventing large scale authentication credential data leakage due to server compromise. Further, credential blobs may include other sensitive information, such as, for example, credit card information. Furthermore, illustrative embodiments provide a lightweight solution that does not require multiple rounds of network communication.

As a result, illustrative embodiments provide an improved user authentication mechanism for existing systems and newer biometric approaches. Moreover, by confining the effect of server attack, illustrative embodiments increase security, usability, and perception of trust.

Figure 5:
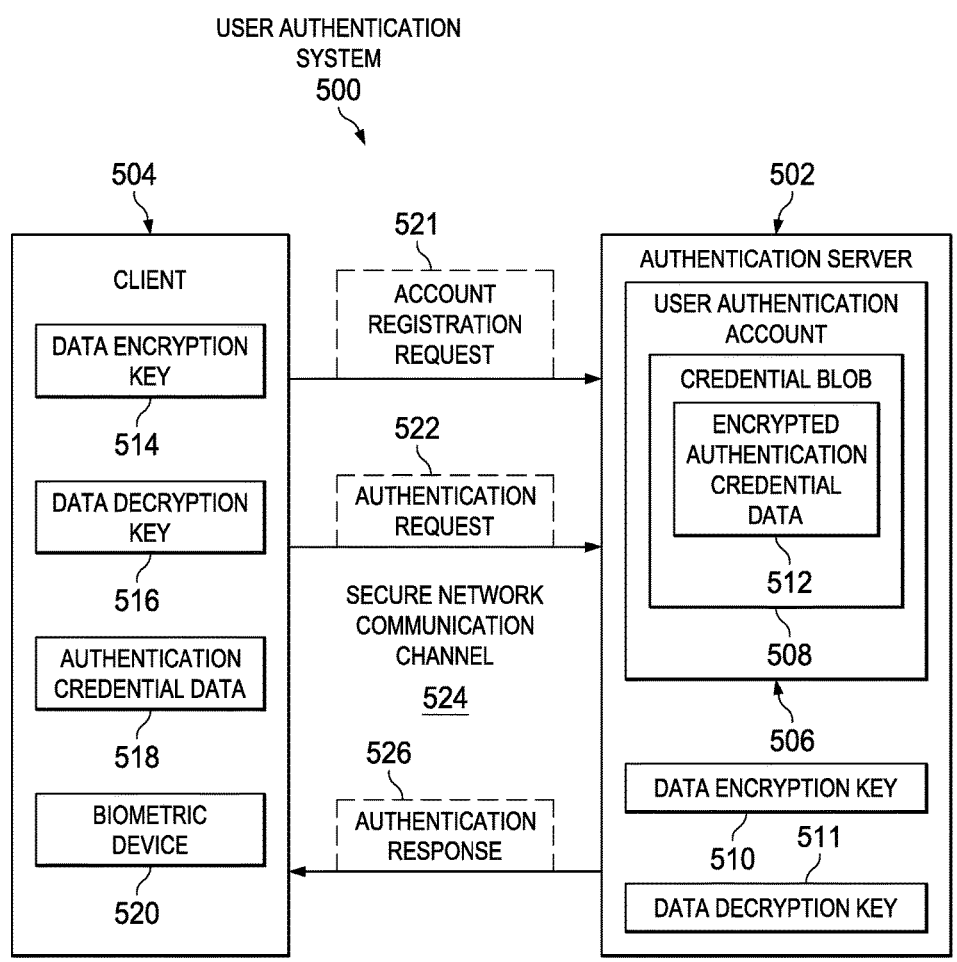
FIG. 5 is a diagram of an example user authentication system in accordance with an illustrative embodiment.

With reference now to FIG. 5, a diagram of an example user authentication system is depicted in accordance with an illustrative embodiment. User authentication system 500 may be implemented in, for example, a network of data processing systems, such as network data processing system 100 in FIG. 1 or in a cloud computing environment, such as cloud computing environment 300 in FIG. 3.

In this example, user authentication system 500 includes authentication server 502 and client 504. Authentication server 502 may be, for example, server 104 in FIG. 1, data processing system 200 in FIG. 2, or a server in cloud computing nodes 310 in FIG. 3. Client 504 may be, for example, client 110 in FIG. 1 or local computing device 320A in FIG. 3. However, it should be noted that user authentication system 500 may include any number of authentication server devices and client devices.

In this example, authentication server 502 stores user authentication account 506. User authentication account 506 may be, for example, user authentication account 220 in FIG. 2. User authentication account 506 corresponds to a particular user of client 504. User authentication account 506 includes credential blob 508. Credential blob 508 may be, for example, credential blob 222 in FIG. 2. Credential blob 508 contains encrypted authentication credential data 512 corresponding to the particular user of client 504. Data encryption key 510, data decryption key 511, and encrypted authentication credential data 512 may be, for example, data encryption key 224, data decryption key 225, and encrypted authentication credential data 226 in FIG. 2.

Also in this example, client 504 generates and stores data encryption key 514 and data decryption key 516. Data encryption key 514 represents data encryption key 510. Authentication server 502 utilizes data encryption key 510 to encrypt authentication credential data 518 received from client 504 during account registration to form encrypted authentication credential data 512. Data encryption key 514 represents data encryption key 510. Data decryption key 516 represents data decryption key 511. Authentication server 502 utilizes data decryption key 511 during user authentication to decrypt encrypted authentication credential data 512. Authentication credential data 518 represents credential information obtained from the particular user of client 504. Authentication credential data 518 may represent a password entered by the user on client 504 and/or a biometric template generated from a biometric sample obtained from the user by biometric device 520. Biometric device 520 may be a biometric scanning device, such as, for example, a fingerprint scanner, a retinal scanner, a voice scanner, a magnetic resonance imaging scanner, an electroencephalograph, or an electrocardiograph, which is coupled to client 504. It should be noted that while depicted in client 504, biometric template data generation may be performed in authentication server 502 instead.

Client 504 sends account registration request 521 via secure network communication channel 524 to authentication server 502 to register the particular user of client 504 and generate user authentication account 506. Account registration request 521 includes identification data corresponding to the particular user, data encryption key 514, authentication credential data 518, and any other necessary attributes. Authentication server 502 generates a biometric template from authentication credential data 518 when a biometric sample of the particular user is included in authentication credential data 518. In addition, authentication server 502 encrypts the biometric template data and any other authentication credential data, such as a password, to form encrypted authentication credential data 512. Further, authentication server 502 stores encrypted authentication credential data 512 in credential blob 508 of user authentication account 506.

Client 504 sends authentication request 522 via secure network communication channel 524 to authentication server 502 to authenticate the particular user of client 504. Authentication request 522 includes data decryption key 516 and authentication credential data 518. Authentication server 502 receives data decryption key 516, which is included in authentication request 522, as data decryption key 511. Authentication server 502 uses data decryption key 511 to decrypt encrypted authentication credential data 512. Then, authentication server 502 compares the decrypted authentication credential data of credential blob 508 with authentication credential data 518 received with authentication request 522. If the decrypted authentication credential data of credential blob 508 match authentication credential data 518 received with authentication request 522, then authentication server 502 verifies that the particular user of client 504 is authentic. If the decrypted authentication credential data of credential blob 508 does not match authentication credential data 518 received with authentication request 522, then authentication server 502 rejects the particular authentication attempt of client 504 as non-authentic and fails the authentication attempt. Authentication server 502 informs the particular user of the result of the authentication credential data comparison by sending authentication response 526 to client 504 via secure network communication channel 524. In addition, authentication server 502 deletes data decryption key 516 and authentication credential data 518 received in authentication request 522 and also deletes any unencrypted data corresponding to user authentication account 506.

Figure 6:
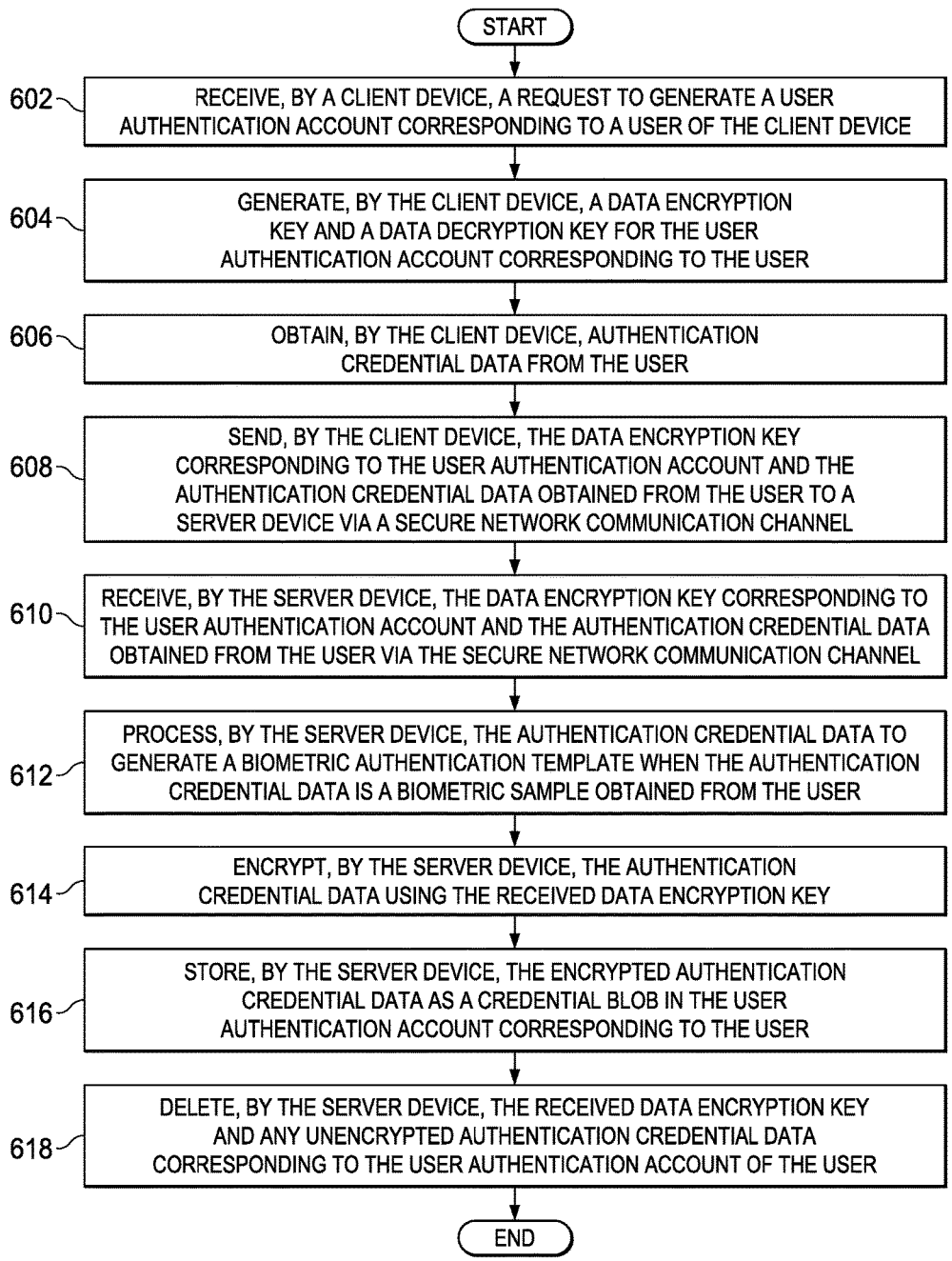
FIG. 6 is a flowchart illustrating a process for generating a user authentication account in accordance with an illustrative embodiment.

With reference now to FIG. 6, a flowchart illustrating a process for generating a user authentication account is shown in accordance with an illustrative embodiment. The process shown in FIG. 6 may be implemented in a server device and a client device in a user authentication system, such as, for example, authentication server 502 and client 504 in user authentication system 500 in FIG. 5.

The process begins when the client device receives a request to generate a user authentication account corresponding to a user of the client device (step 602). The user authentication account may be, for example, user authentication account 506 in FIG. 5. The client device generates a data encryption key and a data decryption key for the user authentication account corresponding to the user (step 604). The data encryption key and the data decryption key may be, for example, data encryption key 514 and data decryption key 516 in FIG. 5.

In addition, the client device obtains authentication credential data from the user (step 606). The authentication credential data may be, for example, authentication credential data 518 in FIG. 5. The client device may obtain the authentication credential data using, for example, a biometric device, such as biometric device 520 in FIG. 5.

Afterward, the client device sends the data encryption key corresponding to the user authentication account and the authentication credential data obtained from the user to the server device via a secure network communication channel (step 608). The secure network communication channel may be, for example, secure network communication channel 524 in FIG. 5. Subsequently, the server device receives the data encryption key corresponding to the user authentication account and the authentication credential data obtained from the user via the secure network communication channel (step 610).

The server device processes the authentication credential data to generate a biometric authentication template when the authentication credential data is a biometric sample obtained from the user (step 612). In addition, the server device encrypts the authentication credential data using the received data encryption key (step 614).

The server device stores the encrypted authentication credential data as a credential blob in the user authentication account corresponding to the user (step 616). The credential blob may be, for example, credential blob 508 in FIG. 5. Further, the server device deletes the received data encryption key and any unencrypted authentication credential data corresponding to the user authentication account of the user (step 618). Thereafter, the process terminates.

Figure 7A:
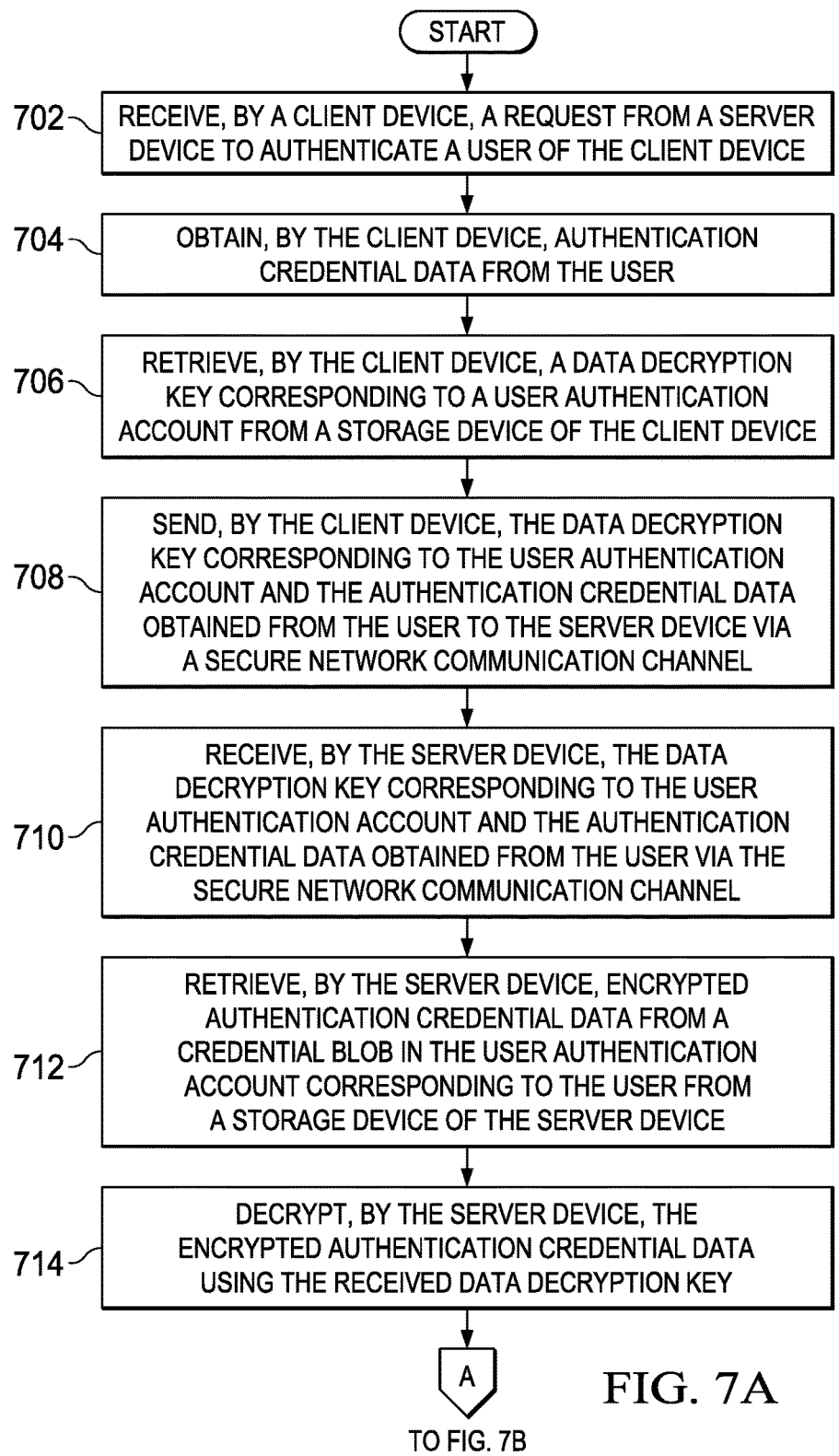
FIGS. 7A-7B are flowcharts illustrating a process for authenticating a user in accordance with an alternative illustrative embodiment.
Figure 7B:
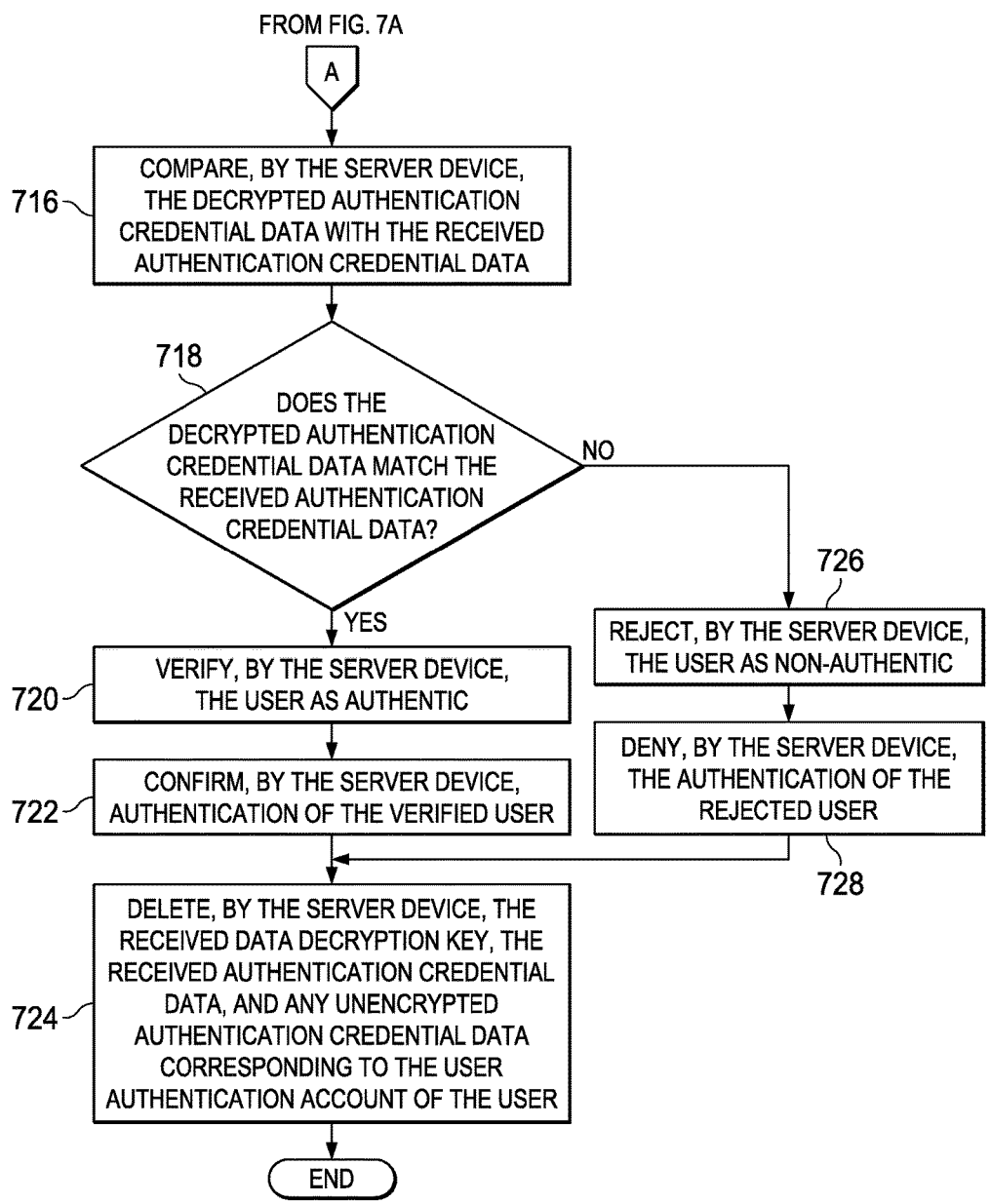

With reference now to FIGS. 7A-7B, a flowchart illustrating a process for authenticating a user is shown in accordance with an alternative illustrative embodiment. The process shown in FIGS. 7A-7B may be implemented in a server device and a client device in a user authentication system, such as, for example, authentication server 502 and client 504 in user authentication system 500 in FIG. 5.

The process begins when the client device receives a request from the server device to authenticate a user of the client device (step 702). The client device obtains authentication credential data from the user (step 704). The authentication credential data may be, for example, authentication credential data 518 in FIG. 5. The client device may obtain the authentication credential data using, for example, a biometric device, such as biometric device 520 in FIG. 5.

In addition, the client device retrieves a data decryption key corresponding to a user authentication account from a storage device of the client device (step 706). The data decryption key may be, for example, data decryption key 516 in FIG. 5. Afterward, the client device sends the data decryption key corresponding to the user authentication account and the authentication credential data obtained from the user to the server device via a secure network communication channel (step 708). The secure network communication channel may be, for example, secure network communication channel 524 in FIG. 5.

Subsequently, the server device receives the data decryption key corresponding to the user authentication account and the authentication credential data obtained from the user via the secure network communication channel (step 710). The server device retrieves encrypted authentication credential data from a credential blob in the user authentication account corresponding to the user from a storage device of the server device (step 712). The encrypted authentication credential data in the credential blob of the user authentication account may be, for example, encrypted authentication credential data 512 in credential blob 508 of user authentication account 506 in FIG. 5.

The server device decrypts the encrypted authentication credential data using the received data decryption key (step 714). Afterward, the server device compares the decrypted authentication credential data with the received authentication credential data (step 716).

The server device makes a determination as to whether the decrypted authentication credential data matches the received authentication credential data (step 718). If the server device determines that the decrypted authentication credential data does match the received authentication credential data, yes output of step 718, then the server device verifies the user as authentic (step 720) and confirms authentication of the verified user (step 722). Furthermore, the server device deletes the received data decryption key, the received authentication credential data, and any unencrypted authentication credential data corresponding to the user authentication account of the user (step 724) and the process terminates thereafter.

Returning again to step 718, if the server device determines that the decrypted authentication credential data does not match the received authentication credential data, no output of step 718, then the server device rejects the user as non-authentic (step 726). In addition, the server device denies the authentication of the rejected user (step 728) and the process returns to step 724 thereafter.

Figure 8:
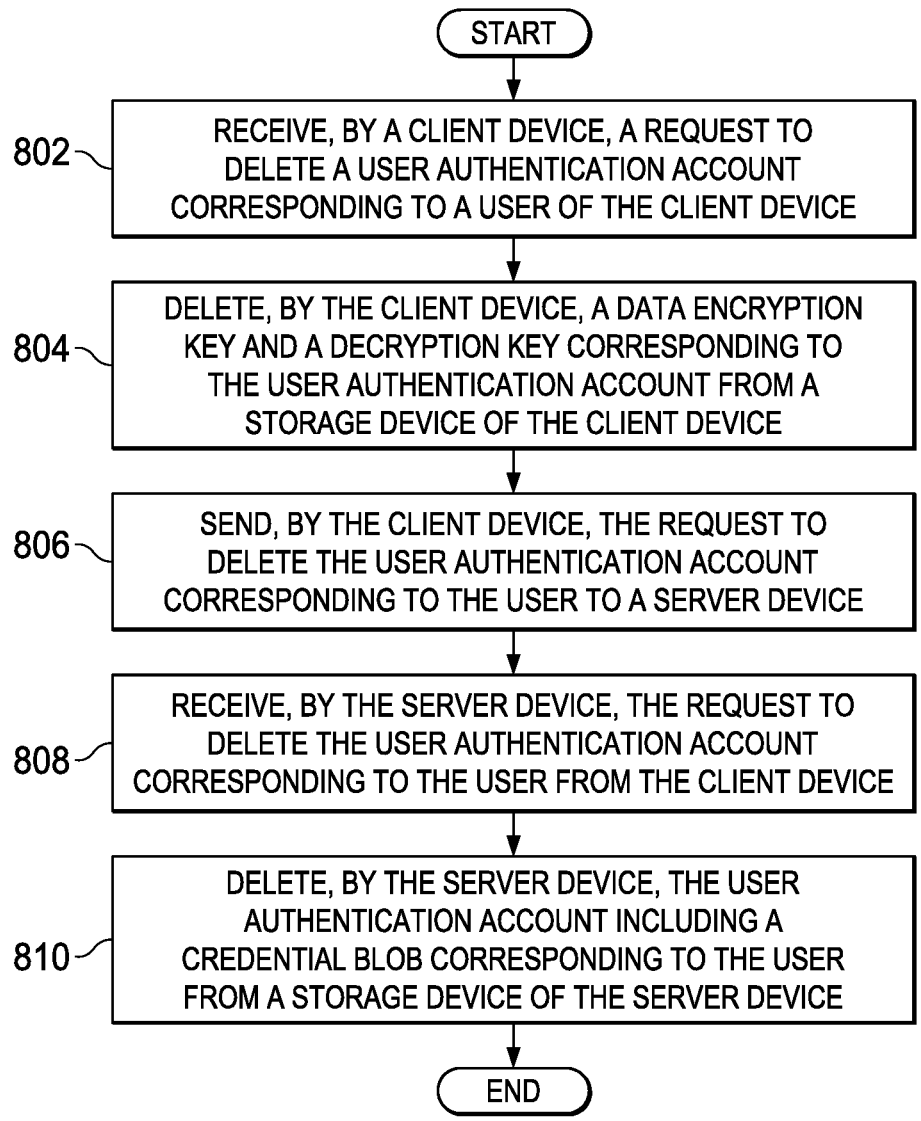
FIG. 8 is a flowchart illustrating a process for deleting a user authentication account in accordance with an alternative illustrative embodiment.

With reference now to FIG. 8, a flowchart illustrating a process for deleting a user authentication account is shown in accordance with an alternative illustrative embodiment. The process shown in FIG. 8 may be implemented in a server device and a client device in a user authentication system, such as, for example, authentication server 502 and client 504 in user authentication system 500 in FIG. 5.

The process begins when the client device receives a request to delete a user authentication account corresponding to a user of the client device (step 802). The client device deletes a data encryption key and a data decryption key corresponding to the user authentication account from a storage device of the client device (step 804). The data encryption key and the data decryption key corresponding to the user authentication account may be, for example, data encryption key 514 and data decryption key 516 in FIG. 5. In addition, the client device sends the request to delete the user authentication account corresponding to the user to the server device (step 806).

Subsequently, the server device receives the request to delete the user authentication account corresponding to the user from the client device (step 808). The server device deletes the user authentication account including a credential blob corresponding to the user from a storage device of the server device (step 810). The user authentication account including the credential blob corresponding to the user may be, for example, user authentication account 506 including credential blob 508 in FIG. 5. Thereafter, the process terminates.

Figure 9:
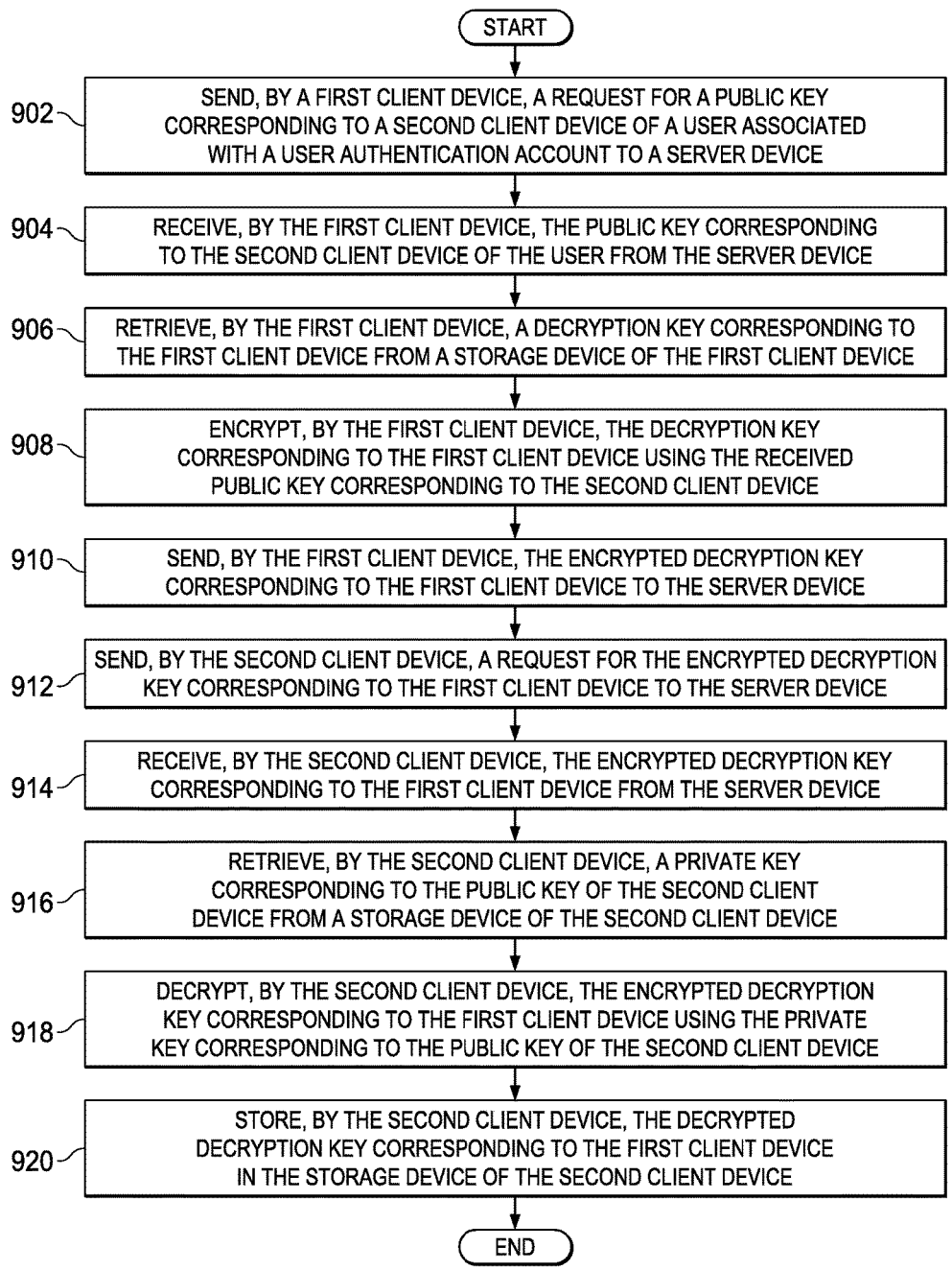
FIG. 9 is a flowchart illustrating a process for transferring an encryption key from one client device to another client device in accordance with an alternative illustrative embodiment.

With reference now to FIG. 9, a flowchart illustrating a process for transferring an encryption key from one client device to another client device is shown in accordance with an alternative illustrative embodiment. The process shown in FIG. 9 may be implemented in, for example, a network of data processing systems, such as network data processing system 100 in FIG. 1 or in a cloud computing environment, such as cloud computing environment 300 in FIG. 3.

The process begins when a first client device sends a request for a public key corresponding to a second client device of a user associated with a user authentication account to a server device (step 902). The first client device may be, for example, client 110 in FIG. 1 or local computing device 320A in FIG. 3. The second client device may be, for example, client 112 in FIG. 1 or local computing device 320B in FIG. 3. The server device may be, for example, server 104 in FIG. 1.

The first client device receives the public key corresponding to the second client device of the user from the server device (step 904). In addition, the first client device retrieves a decryption key corresponding to the first client device from a storage device of the first client device (step 906). The first client device also encrypts the decryption key corresponding to the first client device using the received public key corresponding to the second client device (step 908). Further, the first client device sends the encrypted decryption key corresponding to the first client device to the server device (step 910).

The second client device sends a request for the encrypted decryption key corresponding to the first client device to the server device (step 912). Subsequently, the second client device receives the encrypted decryption key corresponding to the first client device from the server device (step 914). The second client device retrieves a private key corresponding to the public key of the second client device from a storage device of the second client device (step 916). Then, the second client device decrypts the encrypted decryption key corresponding to the first client device using the private key corresponding to the public key of the second client device (step 918). Afterward, the second client device stores the decrypted decryption key corresponding to the first client device in the storage device of the second client device (step 920).

Thus, illustrative embodiments of the present invention provide a computer-implemented method, computer system, and computer program product for authenticating a user of a client device by a server during an authentication attempt using a decryption key received from the client device to decrypt a credential blob stored in a user authentication account on the server. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for authenticating a user, the computer-implemented method comprising:
   receiving, by a computer, a data decryption key corresponding to an authentication account of the user of a client device and authentication credential data obtained from the user of the client device during authentication, wherein the authentication credential data obtained from the user during the authentication comprises a password and a biometric sample of the user;
   decrypting, by the computer, encrypted authentication credential data retrieved from storage and corresponding to the user using the received data decryption key;
   comparing, by the computer, the decrypted authentication credential data with the received authentication credential data to authenticate the user of the client device; and
   deleting, by the computer, the received data decryption key, the received authentication credential data, and any unencrypted authentication credential data corresponding to the authentication account of the user.

2. The computer-implemented method of claim 1 further comprising:
   determining, by the computer, whether the decrypted authentication credential data matches the received authentication credential data.

3. The computer-implemented method of claim 2 further comprising:
   responsive to the computer determining that the decrypted authentication credential data does match the received authentication credential data, verifying, by the computer, the user as authentic; and
   allowing, by the computer, the authentication of the verified user.

4. The computer-implemented method of claim 2 further comprising:
   responsive to the computer determining that the decrypted authentication credential data does not match the received authentication credential data, rejecting, by the computer, the user as non-authentic; and
   denying, by the computer, the authentication of the rejected user.

5. The computer-implemented method of claim 1 further comprising:
   processing, by the computer, the received authentication credential data to generate and store an encrypted biometric template in response to the received authentication credential data being a biometric sample obtained from the user by the client device.

6. The computer-implemented method of claim 1 further comprising:
   storing, by the computer, the encrypted authentication credential data as a credential blob in the authentication account corresponding to the user.

7. The computer-implemented method of claim 6, wherein the credential blob includes an expiry date, and wherein the expiry date is a time when information contained in the credential blob expires such that the credential blob includes both encrypted and unencrypted data.

8. The computer-implemented method of claim 1 further comprising:
receiving, by the computer, a request from the client device to delete the authentication account corresponding to the user; and
deleting, by the computer, the authentication account from a storage device of the computer.

9. The computer-implemented method of claim 1 further comprising:
receiving, by the computer, an encrypted decryption key from a first client device to transfer the encrypted encryption key to a second client device;
receiving, by the computer, a request from the second client device for the encrypted decryption key corresponding to the first client device; and
sending, by the computer, the encrypted decryption key corresponding to the first client device to the second client device, wherein the second client device decrypts the encrypted decryption key corresponding to the first client device using a private key corresponding to a public key of the second client device used to encrypt the encrypted decryption key on the first client device.

10. A computer system for authenticating a user, the computer system comprising:
a bus system;
a storage device connected to the bus system, wherein the storage device stores program instructions; and
a processor connected to the bus system, wherein the processor executes the program instructions to:
receive a data decryption key corresponding to an authentication account of the user of a client device and authentication credential data obtained from the user of the client device during authentication, wherein the authentication credential data obtained from the user during the authentication comprises a password and a biometric sample of the user;
decrypt encrypted authentication credential data retrieved from storage and corresponding to the user using the received data decryption key; and
compare the decrypted authentication credential data with the received authentication credential data to authenticate the user of the client device; and
deleting, by the computer, the received data decryption key, the received authentication credential data, and any unencrypted authentication credential data corresponding to the authentication account of the user.

11. The computer system of claim 10, wherein the processor further executes the program instructions to:
determine whether the decrypted authentication credential data matches the received authentication credential data.

12. The computer system of claim 11, wherein the processor further executes the program instructions to:
verify the user as authentic in response to determining that the decrypted authentication credential data does match the received authentication credential data; and
allow the authentication of the verified user.

13. The computer system of claim 11, wherein the processor further executes the program instructions to:
reject the user as non-authentic in response to determining that the decrypted authentication credential data does not match the received authentication credential data; and
deny the authentication of the rejected user.

14. A computer program product for authenticating a user, the computer program product comprising a non-transitory computer readable storage medium having program instructions embodied therewith, the program instructions executable by a computer to cause the computer to perform a method comprising:
receiving, by the computer, a data decryption key corresponding to an authentication account of the user of a client device and authentication credential data obtained from the user of the client device during authentication, wherein the authentication credential data obtained from the user during the authentication comprises a password and a biometric sample of the user;
decrypting, by the computer, encrypted authentication credential data retrieved from storage and corresponding to the user using the received data decryption key;
comparing, by the computer, the decrypted authentication credential data with the received authentication credential data to authenticate the user of the client device; and
deleting, by the computer, the received data decryption key, the received authentication credential data, and any unencrypted authentication credential data corresponding to the authentication account of the user.

15. The computer program product of claim 14 further comprising:
determining, by the computer, whether the decrypted authentication credential data matches the received authentication credential data.

16. The computer program product of claim 15 further comprising:
responsive to the computer determining that the decrypted authentication credential data does match the received authentication credential data, verifying, by the computer, the user as authentic; and
allowing, by the computer, the authentication of the verified user.

17. The computer program product of claim 15 further comprising:
responsive to the computer determining that the decrypted authentication credential data does not match the received authentication credential data, rejecting, by the computer, the user as non-authentic; and
denying, by the computer, the authentication of the rejected user.

* * * * *